United States Patent
Hayward

(10) Patent No.: US 11,512,266 B2
(45) Date of Patent: Nov. 29, 2022

(54) DISINFECTANT COMPOSITION

(71) Applicant: The Procter & Gamble Company, Cincinnati, OH (US)

(72) Inventor: Adam Simon Hayward, Durham (GB)

(73) Assignee: The Procter & Gamble Company, Cincinnati, OH (US)

( * ) Notice: Subject to any disclaimer, the term of this patent is extended or adjusted under 35 U.S.C. 154(b) by 108 days.

(21) Appl. No.: 16/926,797

(22) Filed: Jul. 13, 2020

(65) Prior Publication Data

US 2021/0017471 A1 Jan. 21, 2021

(30) Foreign Application Priority Data

Jul. 16, 2019 (EP) .................................... 19186571
Jul. 7, 2020 (EP) .................................... 20184423

(51) Int. Cl.
| | |
|---|---|
| C11D 1/00 | (2006.01) |
| C11D 1/62 | (2006.01) |
| C11D 1/66 | (2006.01) |
| C11D 1/75 | (2006.01) |
| C11D 3/30 | (2006.01) |
| C11D 3/37 | (2006.01) |
| C11D 3/48 | (2006.01) |
| C11D 3/34 | (2006.01) |
| C11D 17/04 | (2006.01) |

(52) U.S. Cl.
CPC .................. *C11D 3/30* (2013.01); *C11D 1/75* (2013.01); *C11D 3/349* (2013.01); *C11D 3/378* (2013.01); *C11D 3/3765* (2013.01); *C11D 3/3773* (2013.01); *C11D 17/049* (2013.01)

(58) Field of Classification Search
CPC .... C11D 1/00; C11D 1/62; C11D 1/66; C11D 1/75; C11D 3/30; C11D 3/37; C11D 3/3746; C11D 3/3769; C11D 3/378; C11D 3/3796; C11D 3/48; C11D 17/049
See application file for complete search history.

(56) References Cited

U.S. PATENT DOCUMENTS

| | | | |
|---|---|---|---|
| 6,251,849 B1 | 6/2001 | Jeschke | |
| 6,762,162 B1 | 7/2004 | Valpey, III | |
| 7,799,751 B2 | 9/2010 | Kilkenny | |
| 7,807,766 B2 | 10/2010 | Albers | |
| 2007/0179265 A1* | 8/2007 | Albers | C08F 220/54 526/317.1 |
| 2013/0095163 A1 | 4/2013 | Wolff | |
| 2016/0143275 A1* | 5/2016 | Lan | A01N 33/04 424/722 |

FOREIGN PATENT DOCUMENTS

| | | |
|---|---|---|
| CN | 103849499 B | 10/2017 |
| DE | 10063427 A1 | 7/2002 |
| EP | 1972683 B1 | 6/2011 |
| EP | 2677022 B1 | 10/2015 |
| EP | 2797413 B1 | 9/2018 |
| EP | 2886635 B1 | 2/2019 |
| EP | 3444326 A1 | 2/2019 |
| WO | WO0135909 A1 | 5/2001 |

OTHER PUBLICATIONS

Extended European Search Report; Application No. 19186571.6-1105; dated Jan. 3, 2020; 8 pages.
International Search Report and Written Opinion; Application Ser. No. PCT/US2020/070258; dated Sep. 29, 2020; 13 pages.

* cited by examiner

*Primary Examiner* — Brian P Mruk

(74) *Attorney, Agent, or Firm* — Carolyn S. Powell; George H. Leal

(57) ABSTRACT

A disinfectant cleaning composition, the composition comprising: a nitrogen containing biocidal compound; a polymer comprising monomers of the following formulae: a) H2C=CR1-CO—NH—R2-N+R3R4R5X— wherein R1 represents hydrogen or C1-C4 alkyl; R2 represents linear or branched C1-C12 alkylene; R3, R4 and R5, independently of one another, each represent hydrogen, C1-C18 alkyl or phenyl; and X— represents an anion selected from the group consisting of halide, sulfate, alkylsulfate, hydroxide, phosphate, acetate and formate; b) 40-75% by weight of N-isopropylacrylamide, based on the water-soluble polymer; c) acrylic and/or methacrylic acid and/or salts thereof; and d) H2C=CR—CO—NH—CR'R"R'"—SO3H, and salts thereof; wherein R, R' and R" independently represent hydrogen, C1-C4 alkyl or C1-C4 alkylene, and R'" independently represents C1-C4 alkyl or C1-C4 alkylene.

15 Claims, No Drawings

DISINFECTANT COMPOSITION

FIELD OF THE INVENTION

The present invention is in the field of disinfectant compositions, in particular the field of disinfectant cleaning compositions. The composition provides biocidal residuality and at the same time good cleaning and shine.

BACKGROUND OF THE INVENTION

Compositions as those described in WO 2016/086012 A1 provide long lasting disinfectant benefits. However, surfaces treated with such compositions can be left with a poor shine profile, a low drying rate and a sticky/tacky feel that connotes lack of cleanness to the user.

Therefore, a need remains for a disinfectant composition providing good cleaning, shine and long-lasting disinfection. Preferably, the composition would be suitable for surfaces which contact food.

SUMMARY OF THE INVENTION

According to the first aspect of the present invention, there is provided a disinfectant cleaning composition. The composition provides biocidal residuality.

According to the second aspect of the invention there is provided an article treated with the composition of the first aspect of the invention. The article is in the form of a disposable or partially reusable substrate comprising one or more nonwoven layers. The article provides sanitization to surfaces, in particular hard surfaces. The article is sometimes herein referred to as "the article of the invention".

According to the third aspect of the invention there is provided the use of the composition of the invention to provide biocidal residuality to a surface, in particular to a hard surface.

The elements of the composition of the invention described in relation to the first aspect of the invention apply mutatis mutandis to the other aspects of the invention.

DETAILED DESCRIPTION OF THE INVENTION

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mould, mildew and algae. Viral particles and other infectious agents are also included in the term microbe.

"Antimicrobial" further should be understood to encompass both microbicidal and microbiostatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g. against bacteria and fungi). When speaking of efficacy against a particular microorganism or taxonomic rank, the more focused term will be used (e.g. antifungal to denote efficacy against fungal growth in particular). Using the above example, it should be understood that efficacy against fungi does not in any way preclude the possibility that the same antimicrobial composition may demonstrate efficacy against another class of microbes.

Residual biocidal properties refer to achieving at least 99.9% microbial reduction in the Environmental Protection Agency (EPA)-approved 24 hour Residual Self Sanitizing (RSS) test methodology for dried product residues on hard, non-porous surfaces (EPA #01-1A). That is, the compositions of the invention displaying residual biocidal properties are able to deliver at least 99.9% microbial reduction after a 12-abrasion and 5-reinoculation 24 hour testing regime.

Disinfectant Composition

The present invention is directed to a disinfectant composition. The composition comprises a nitrogen containing biocidal compound and a polymer. The composition may further comprise a carrier, preferably water, a surfactant, a pH adjusting agent and a fragrance, among other components. Preferably the composition is in liquid form, more preferably in the form of an aqueous solution, preferably the composition comprises more than 80%, more preferably more than 90% and especially from 95 to 99% by weight of the composition of water.

The composition is formulated having surface disinfection and residual biocidal properties for at least 24 hours, via delivering at least 99.9% microbial reduction in the EPA-approved 24 hour RSS test method (EPA #01-1A) The composition can be applied to a surface by spraying, rolling, fogging, wiping or other means. The composition acts as a surface disinfectant, killing infectious microbes present on the surface for at least 24 hours.

Once dried, the liquid formulation leaves a residual protective film on the surface. The residual film possesses a biocidal property, enabling it to maintain protection of the surface against microbial contamination for an extended time period after its application.

The disinfectant composition imparts a film with the capacity to quickly kill bacteria and other germs for at least 24 hours after deposit of the film on the treated surface. Quick kill generally refers to a time period of about 30 seconds to about 5 minutes. The film will remain on the surface and is durable to multiple touches and wearing of the surface. After the composition is applied to a surface the surface presents a good shine profile.

Nitrogen containing biocidal compound

Preferred nitrogen containing biocides suitable for the composition of the invention include quaternary ammonium compounds, biguanides, chlorhexidine salts and mixtures thereof.

The nitrogen containing biocide may be a quaternary ammonium compound (QAC) with the following molecular structure:

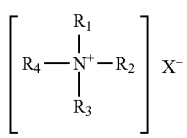

wherein R1, R-2, R3, and R4 are independently selected and include, but are not limited to, alkyl, alkoxy, or aryl, either with or without heteroatoms, or saturated or non-saturated. Some or all of the functional groups may be the same.

The corresponding anion X" includes, but is not limited to, a halogen, sulfonate, sulfate, phosphonate, phosphate, carbonate/bicarbonate, hydroxy, or carboxylate.

QACs include, but are not limited to, n-alkyl dimethyl benzyl ammonium chloride, di-n-octyl dimethyl ammonium chloride, dodecyl dimethyl ammonium chloride, n-alkyl dimethyl benzyl ammonium saccharinate, and 3-(trimethoxysilyl) propyldimethyloctadecyl ammonium chloride.

Combinations of monomeric QACs are preferred to be used for the composition of the invention. A specific example of QAC combination is N-alkyl dimethyl benzyl ammonium chloride (40%); N-octyl decyl dimethyl ammonium chloride (30%); di-n-decyl dimethyl ammonium chloride (15%); and di-n-dioctyl dimethyl ammonium chloride (15%). The percentage is the weight percentage of individual QAC based on the total weight of blended QACs composition. Examples of commercially available quaternary ammonium compounds include, but are not limited to, Bardac 205M and 208M from Lonza, and BTC885 from Stepan Company. The composition comprises from about 0.05% to about 20%, preferably from 0.05% to 10% by weight of the composition of QAC.

Another class of nitrogen-containing biocides useful for the present invention are those chemical compounds with biguanide moiety in the molecule. For example, a polymeric biguanide, otherwise known as a polybiguanide, or a salt, analog, or derivative thereof. The polybiguanide may be a copolymer or a heteropolymer. The polybiguanide may be linear, branched, circular, and/or dendrimeric. The average number of polymer repeating units can vary from 2 to 1,000, such as from 5 to 100, such as from 10 to 50. The polybiguanide may comprise polyhexamethylene biguanide (PHMB), polyhexamethylene monoguanide (PHMG), polyethylene biguanide (PEB), polytetramethylene biguanide (PTMB), polyhexamethylene biguanide (PHMB), polymethylene biguanide (PMB), poly(allylbiguanidinio-co-allyamine, poly(N-vinyl-biguanide), polyallylbsguanide etc. Preferred polymeric biguanide for use herein is a polyalkylene biguanide, more preferably polyhexamethylene biguanide hydrochloride with an average of repeating biguanide units between 10 and 50 or from 10 to 25. Such polyhexamethylene biguanide is supplied as a 20% solution in water and sold for multiple applications by Lonza under variants of the tradename Vantocil (e.g., Vantocil IB, Vantocil P, etc.) as well as under the tradename Reputex.

Another class of nitrogen-containing biocides useful for the present invention are chlorhexidine salts. Chlorhexidine salts include chlorhexidine digluconate, chlorhexidine dihydrochloride, chlorhexidine bis-bicarbonate, chlorhexdine carbonate or chlorhexidine diacetate. Chlorhexidine diacetate can be purchased from Medichem SA as chlorhexidine diacetate hydrate.

Another class of nitrogen-containing biocides useful for the present invention are tertiary alkyl amines, such as an alkyl amine having from about 8 to about 16 carbon atoms.

Examples of amine biocides that may be used in the composition include N, N-bis(3-aminopropyl) dodecylamine, N-(3-aminopropyl)-N-dodecylpropane-1,3-diamine, N-(3-aminopropyl)-N-decyl-1,3-propanediamine, N-(3-aminopropyi)-N-tetradecyl-1,3-propanediamine, or mixtures thereof.

The composition comprises from about 0.05% to about 20%, preferably from 0.05% to 10% by weight of the composition of the nitrogen containing biocidal compound.
Polymer The composition preferably comprises from about 0.0005% to about 5% preferably from about 0.001% to about 4% by weight of the composition of the polymer. More preferably from about 0.05% to about 3% by weight of the composition of the polymer. The polymer of the composition of the invention comprises four monomers.

Monomer Component a)
The monomers of this type follow the general formula:

wherein R1 represents a hydrogen atom or an alkyl radical with 1 to 4 C atoms, R2 represents a linear or branched alkylene radical with 1 to 12 C atoms and R3, R4 and R5 independently of one another represent a hydrogen atom, an alkyl radical with 1 to 18 C atoms, or a phenyl radical, and X represents an anion from the group of halogens, sulfates or alkylsulfates, hydroxide, phosphate, acetate, formate or ammonium. Particularly preferred are monomers of type a) in which R1 represents a methyl radical, R2 represents a CH2-CH2-CH2 group, and the radicals R3, R4 and R5 each represent a methyl radical. X— represents a suitable counter-ion such as halide, hydroxide, sulfate, hydrogen sulfate, phosphate, formate or acetate, preferably chloride. The monomer, 3-trimethylammoniumpropylmethacrylamide chloride (MAPTAC), is particularly preferred.

Monomer Component b)
The second monomer building block contained in the polymers in accordance with the invention is a nitrogen-containing, ethylenically unsaturated compound of the following general formula:

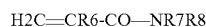

wherein R6 represents a hydrogen atom or an alkyl radical with 1 to 4 C atoms and R7 and R8, independently of one another, each represent a hydrogen atom, an alkyl radical with 1 to 4 C atoms or a C3-C6 cycloalkyl radical, with the specification that R7 and R8 do not simultaneously represent hydrogen. Monomer b) encompasses the acrylamides. Particularly preferred is N-isopropylacrylamide, also known under the abbreviation NIPAM.

Monomer Component c)
As the third component c), ethylenically unsaturated acids and their salts such as acrylic or methacrylic acid are suitable. Methacrylic acid (M) is the particularly preferred monomer here. Particularly suitable salts are the alkali metal and ammonium salts.

Monomer Component d)
The monomers of this type follow the general formula:
H2C=CR—CO—NH—CR'R"R'"—SO3H and salts thereof, especially the alkali metal and ammonium salts, wherein R, R', and R" independently of one another represent a hydrogen atom or an alkyl(ene) radical with 1 to 4 C atoms, and R'" independently represents an alkyl(ene) radical with 1 to 4 C atoms. Particularly preferred here as the monomer building block of type d) is the molecule with the general formula or H2C=CR—CO—NH—CR'R"R'"—

SO3H, wherein especially a derivative, 2-acrylamido-2-methylpropane-sulfonic acid (AMPS) is suitable.

Additional monomer building blocks may be present in the polymers in accordance with the invention in addition to the aforementioned a) to d), wherein here especially nitrogen-containing monomers are preferred. Examples are dimethyldiallylammonium chloride (DADMAC), 2-dimethylaminoethyl(meth)acrylate (DMAE(M)A), 2-diethylaminoethyl(meth)acrylate, 3-dimethylaminopropyl(meth)acrylamide (DMAP(M)A), 3-dimethyl-amino-2,2-dimethylpropylacrylamide (DMADMPA), and the derivatives thereof, which can be obtained by protonation or quaternization, especially 2-trimethyl-ammoniumethyl(meth)acrylate chloride and 3-diethylmethylammoniumpropyl-acrylamide chloride.

The polymers in accordance with the invention are water-soluble, i.e., at least 0.1 g of the polymer is soluble in 100 ml water at 20° C. The polymers are ampholytic, i.e., the polymers have both acid and basic hydrophilic groups and show acidic or basic behaviour depending on the conditions. The polymers in accordance with the invention preferably have a mean molecular weight (weight average molecular weight, Mw), measured by aqueous gel permeation chromatography (GPC) with light scattering detection (SEC-MALLS), in the range of 10,000 to 500,000 Da. Preferably, the molecular weight of the polymers is between 50,000 and 350,000 Da and especially between 100,000 and 250,000 Da. A particularly preferred range may fall between 110,000 and 140,000 Da.

The various monomer building blocks a) to d) preferably occur in certain selected quantitative ratios along with one another. Preferred in each case are polymers that contain the component (b) in excess (both on a molar basis and based on the weight of the components) relative to the components a) and c). Preferred here are polymers in which the molar ratio between the monomers a), b) and c) is in the range from 1:10:1 to 5:10:5 and preferably in the range from 4:10:1 to 4.10:3 and especially in the range form 3:8:2 to 3:8:1.

Particularly preferred are especially polymers in which the molar ratio between the components a) and b) is 1:10 to 1:1 and especially 1:5 to 1:1.

Based on mol-% of the respective monomers, preferably 20 to 30% of monomer a), 50 to 70% of monomer b) and 10 to 20% of monomer c) are present. Preferably the monomer building blocks c) and d) are present simultaneously in a molar ratio of 2:1 to 1:2, but particularly preferably in a 1:1 ratio. Particularly preferred polymers with four different monomer building blocks have molar ratios a):b):c):d) of 2:4:1:1 to 1:10:1:1. A particularly preferred ratio is 3:8:1:1.

Preferred polymers in particular are those in which the monomer a) is selected from compounds of the general formula in which R' represents a methyl group, R2 represents an alkylene radical with 3 C atoms, R3, R4 and R5 respectively represent methyl radicals and X represents chloride, the monomer b) is selected from compounds of the general formula in which R6 and R7 represent hydrogen atoms and R8 represents an isopropyl radical, and monomer c) represents H2C=CR—CO—NH—CR'R''R'''—SO3H and its salts, especially the alkali metal and ammonium salts, wherein R, R', and R'' independently of one another represent a hydrogen atom or an alkyl(ene) radical with 1 to 4 C atoms, and R''' independently represents an alkyl(ene) radical with 1 to 4 C atoms.

Such polymers in accordance with the invention can be produced by various polymerization processes. They can, for example, be produced by solution polymerization or bulk polymerization. Preferably they are produced by solution polymerization, thus polymerization of monomers in solvents and/or water, in which both the monomers and the polymers resulting from them are soluble. In addition, the polymerization can be performed by taking the total quantity of monomer initially or under monomer inflow, batchwise, semi-continuously or continuously. Preferably, the polymerization is performed as batch polymerization with or without monomer inflow. Details for the process to produce the polymers for the composition of the invention are found in US 2007/0179265 A1.

Particularly preferred and therefore another aspect of the present invention is a polymer that is soluble in water at 20° C., containing the four different monomers a), b), c) and d), wherein the monomers a) and b) are present in a molar ratio of 1:1 to 1:10 and in addition the monomers c) and d) are present, wherein as the monomer a) 3-trimethylammonium-propyl-methacrylamide chloride (MAPTAC) is preferred, as the monomer b)N-isopropyl-acrylamide (NIPAM), as monomer c) acrylic acid (M) and/or methacrylic acid (MA), and as monomer d) 2-acrylamido-2-methyl-1-propanesulfonic acid (AMPS) is preferred, with the specification that the monomer c) is present in the water-soluble polymer in quantities of a maximum of 25 wt % based on the total weight of the water-soluble polymer. Polymers in accordance with the preceding description are preferred in which the weight fraction of monomer c) amounts to less than 15 wt % and especially equal to or less than 10 wt %. A preferred weight range for monomer c) is 5 to 25.

A preferred polymer is water-soluble at 20° C. and contains the monomers MAPTAC, NIPAM, M and AMPAS in weight ratios of 25 to 45% MAPTAC, 40 to 70% NIPAM, 1 to 15% M and 1 to 15% AMPS, with the specification that the sum of the percentages is 100.

For these polymers as well, the above-described preferred molar ratios are applicable, and also the preferred weight ratios of the monomers within the polymers, i.e., thus the molar ratio between the monomers a), b) and c) or d) lies in the range of 1:10:1 to 5:10:5 and preferably in the range of 4:10:1 to 4:10:3 and especially in the range of 3:8:2 to 3:8:1. A particularly preferred polymer contains the monomers a), b), c) and d) in the molar ratio of 3:8:1:1.

The weight ratio based on the polymer amounts to 20 to 30 wt % of monomer a), 50 to 70 wt % of monomer b) and 10 to 20 wt % of monomers c) and/or d), with the specification that the sum of the percentages is 100. The monomers c) and d), if they are present simultaneously in the polymer, are preferably present in the weight ratio of 1:1. The mean molecular weight of the selected polymers, as described in detail above, is preferably in the range of 10,000 to 500,000.

Surfactant

The composition of the invention may comprise from 0.1 to 5% by weight of the composition of surfactant. The surfactant contributes to cleaning and spreading of the composition on the surface to be cleaned.

Alcohol Alkoxylated Nonionic Surfactants

Suitable alcohol alkoxylated nonionic surfactants are according to the formula RO-(A)nH, wherein: R is a primary $C_4$ to $C_{18}$, preferably a $C_6$ to $C_{16}$, more preferably a $C_6$ to $C_{14}$ branched or linear alkyl chain, or a $C_6$ to $C_{28}$ alkyl benzene chain; A is an ethoxy or propoxy or butoxy unit, or mixtures thereof, and wherein n is from 1 to 30, preferably from 1 to 15, more preferably from 3 to 12 even more preferably from 3 to 8. Preferred R chains for use herein are the $C_6$ to $C_{16}$ linear or branched alkyl chains.

Suitable branched alkoxylated alcohol may be selected from the group consisting of: $C_4$-$C_{10}$ alkyl branched alkoxylated alcohols, and mixtures thereof. The branched alkoxylated alcohol can be derived from the alkoxylation of $C_4$-$C_{10}$ alkyl branched alcohols selected form the group consisting of: $C_4$-$C_{10}$ primary mono-alcohols having one or more $C_1$-$C_4$ branching groups.

By $C_4$-$C_{10}$ primary mono-alcohol, it is meant that the main chain of the primary mono-alcohol has a total of from 4 to 10 carbon atoms. The $C_4$-$C_{10}$ primary mono-alcohol can be selected from the group consisting of: methyl butanol, ethyl butanol, methyl pentanol, ethyl pentanol, methyl hexanol, ethyl hexanol, propyl hexanol, dimethyl hexanol, trimethyl hexanol, methyl heptanol, ethyl heptanol, propyl heptanol, dimethyl heptanol, trimethyl heptanol, methyl octanol, ethyl octanol, propyl octanol, butyl octanol, dimethyl octanol, trimethyl octanol, methyl nonanol, ethyl nonanol, propyl nonanol, butyl nonanol, dimethyl nonanol, trimethyl nonanol and mixtures thereof.

The $C_4$-$C_{10}$ primary mono-alcohol can be selected from the group consisting of: ethyl hexanol, propyl hexanol, ethyl heptanol, propyl heptanol, ethyl octanol, propyl octanol, butyl octanol, ethyl nonanol, propyl nonanol, butyl nonanol, and mixtures thereof.

Preferably the $C_4$-$C_{10}$ primary mono-alcohol is selected from the group consisting of: ethyl hexanol, propyl hexanol, ethyl heptanol, propyl heptanol, and mixtures thereof.

The $C_4$-$C_{10}$ primary mono-alcohol is most preferably ethyl hexanol, and propyl heptanol.

In the branched alkoxylated alcohol, the one or more $C_1$-$C_4$ branching group can be substituted into the $C_4$-$C_{10}$ primary mono-alcohol at a C1 to C3 position, preferably at the C1 to C2 position, more preferably at the C2 position, as measured from the hydroxyl group of the starting alcohol.

The branched alkoxylated alcohol can comprise from 1 to 14, preferably from 2 to 7, more preferably from 4 to 6 ethoxylate units, and optionally from 1 to 9, preferably from 2 to 7, more preferably from 4 to 6 of propoxylate units.

The branched alkoxylated alcohol is preferably 2-ethyl hexan-1-ol ethoxylated to a degree of from 4 to 6, and propoxylated to a degree of from 4 to 6, more preferably, the alcohol is first propoxylated and then ethoxylated. Another preferred branched alkoxylated alcohols are 2-alkyl-1-alkanols such as alkoxylated $C_{10}$ guerbet alcohols with 1 to 14, preferably from 2 to 7, more preferably from 3 to 6 ethoxylate or ethoxylate-propoxylate units.

Non-limiting examples of suitable branched alkoxylated alcohols are, for instance, Ecosurf® EH3, EH6, and EH9, commercially available from DOW, and Lutensol® XP alkoxylated Guerbet alcohols & Lutensol® XL ethoxylated Guerbet alcohols available from BASF.

Linear alcohol alkoxylated nonionic surfactants preferred herein are alkoxylated nonionic surfactants with a $C_8$, $C_{10}$, $C_{12}$, mixtures of $C_8$ to $C_{10}$, mixtures of $C_{10}$ to $C_{12}$, mixtures of $C_9$ to C linear alkyl chain and 8 or less ethoxylate units, preferably 3 to 8 ethoxylate units.

Non-limiting examples of suitable linear alkoxylated nonionic surfactants for use herein are Dobanol® 91-2.5 (R is a mixture of $C_9$ and $C_{11}$ alkyl chains, n is 2.5), Dobanol® 91-5 (R is a mixture of $C_9$ to $C_{11}$ alkyl chains, n is 5); Dobanol® 91-10 (R is a mixture of $C_9$ to C alkyl chains, n is 10); Greenbentine DE60 (R is a C10 linear alkyl chain, n is 6); Marlipal 10-8 (R is a $C_{10}$ linear alkyl chain, n is 8); Neodol 91-8 (R is a mixture of $C_9$ to $C_{11}$ alkyl chains, n is 8); Empilan® KBE21 (R is a mixture of $C_{12}$ and $C_{14}$ alkyl chains, n is 21); Lutensol ON30 (R is $C_{10}$ linear alkyl chain, n is 3); Lutensol ON50 (R is $C_{10}$ linear alkyl chain, n is 5); Lutensol ON70 (R is $C_{10}$ linear alkyl chain, n is 7); Novel 610-3.5 (R is mixture of $C_6$ to $C_{10}$ linear alkyl chains, n is 3.5); Novel 810FD-5 (R is mixture of $C_8$ to $C_{10}$ linear alkyl chains, n is 5); Novel 10-4 (R is $C_{10}$ linear alkyl chain, n is 4); Novel 1412-3 (R is mixture of $C_{12}$ to $C_{14}$ linear alkyl chains, n is 3); Lialethl® 11-5 (R is a $C_{11}$ linear alkyl chain, n is 5); Lialethl® 11-21 (R is a mixture of linear and branched $C_{11}$ alkyl chain, n is 21), or mixtures thereof.

The alkoxylated nonionic surfactant may be a secondary alcohol ethoxylate such as for example the Tergitol™-15-S surfactants having the general formula shown below and commercially available by DOW

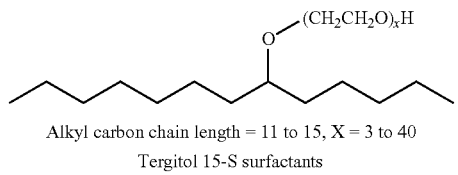

Alkyl carbon chain length = 11 to 15, X = 3 to 40

Tergitol 15-S surfactants

Preferred secondary alcohol ethoxylate surfactants have 3-9 EO units.

Another suitable alkoxylated nonionic surfactant is an alkyl ethoxy alkoxy alcohol, preferably wherein the alkoxy part of the molecule is propoxy, or butoxy, or propoxy-butoxy. More preferred alkyl ethoxy alkoxy alcohols are of formula (II):

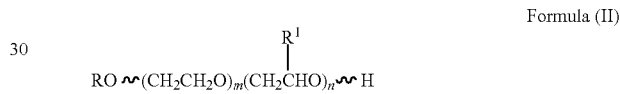

Formula (II)

wherein:
R is a branched or unbranched alkyl radical having 8 to 16 carbon atoms;
$R^1$ is a branched or unbranched alkyl radical having 1 to 5 carbon atoms;
n is from 1 to 10; and m is from 6 to 35.
R is preferably from 12 to 15, preferably 13 carbon atoms.
$R^1$ is preferably a branched alkyl radical having from 1 to 2 carbon atoms. n is preferably 1 to 5. m is preferably from 8 to 25. Preferably, the weight average molecular weight of the ethoxylated alkoxylated nonionic surfactant of formula (II) is from 500 to 2000 g/mol, more preferably from 600 to 1700 g/mol, most preferably 800 to 1500 g/mol.

The ethoxylated alkoxylated nonionic surfactant can be a polyoxyalkylene copolymer. The polyoxyalkylene copolymer can be a block-heteric ethoxylated alkoxylated nonionic surfactant, though block-block surfactants are preferred. Suitable polyoxyalkylene block copolymers include ethylene oxide/propylene oxide block polymers, of formula (III):

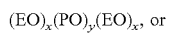

wherein EO represents an ethylene oxide unit, PO represents a propylene oxide unit, and x and y are numbers detailing the average number of moles ethylene oxide and propylene oxide in each mole of product. Such materials tend to have higher molecular weights than most non-ionic surfactants, and as such can range between 1000 and 30000 g/mol, although the molecular weight should be above 2200 and preferably below 13000 to be in accordance with the invention. A preferred range for the molecular weight of the polymeric non-ionic surfactant is from 2400 to 11500 Daltons. BASF (Mount Olive, N.J.) manufactures a suitable set of derivatives and markets them under the Pluronic trademarks. Examples of these are Pluronic (trademark) F77, L62 and F88 which have the molecular weight of 6600, 2450 and 11400 g/mol respectively.

Other suitable ethoxylated alkoxylated nonionic surfactants are described in Chapter 7 of Surfactant Science and Technology, Third Edition, Wiley Press, ISBN 978-0-471-68024-6.

Most preferably the alkoxylated nonionic surfactant is selected from the group consisting of: 2-propylheptyl EO8 (Lutensol XL89-BASF); 2-propylheptyl EO5 (Lutensol XL50-BASF); $C_{10}$ alcohol EO5 (Lutensol ON 50-BASF); $C_{10}$-alcohol EO7 (Lutensol ON 70-BASF); $C_8$-$C_{10}$EO5 (Novel 810 FD5 Sasol); $C_{10}$EO4 (Novel 10-4 Sasol); Tergitol 15-S-3; Tergitol 15-S-5; Tergitol 15-S-7; and Ethyl hexanol PO5EO6 (Ecosurf EH6-Dow).

Alkyl Polyglucosides

Alkyl polyglycosides are biodegradable nonionic surfactants which are well known in the art, and can be used in the compositions of the present invention. Suitable alkyl polyglycosides can have the general formula $C_nH_{2n+1}O(C_6H_{10}O_5)_xH$ wherein n is preferably from 8 to 16, more preferably 8 to 14, and x is at least 1. Examples of suitable alkyl polyglucoside surfactants are the TRITON™ alkyl polyglucosides from Dow; Agnique PG, Disponil APG and Glucopon alkyl polyglucosides from BASF. Preferred alkyl polyglucoside surfactants are those where n is 8 to 12, more preferably 8 to 10, such as for example Triton CG50 (Dow).

Amine Oxide

Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 1 to 30 carbon atoms. Preferred amine oxide surfactants are amine oxides having the following formula: $R_1R_2R_3NO$ wherein R1 is a hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain.

Highly preferred amine oxides are $C_8$ dimethyl amine oxide, $C_{10}$ dimethyl amine oxide, $C_{12}$ dimethyl amine oxide, $C_{14}$ dimethyl amine oxide, and mixtures thereof $C_8$ dimethyl amine oxide is commercially available under the trade name Genaminox® OC from Clariant; $C_{10}$ dimethyl amine oxide is commercially available under the trade name Genaminox® K-10 from Clariant; $C_{12}$ dimethyl amine oxide is commercially available under the trade name Genaminox® LA from Clariant and of Empigen OB from Huntsman; $C_{14}$ amine oxide is commercially available under the trade name of Empigen OH 25 from Huntsman. Other suitable amine oxide surfactants are cocoyldiethoxy amine oxide available under the trade name of Genaminox CHE from Clariant, and cocamydopropyl amine oxide commercially available under the trade name of Empigen OS/A from Huntsman. Particularly preferred amine oxide surfactants are $C_{10}$ dimethyl amine oxide such as Genaminox K-10.

Alkyl Glucamide Surfactants:

The composition of the invention may comprise an alkyl glucamide surfactant. Glucamide surfactants are non-ionic surfactants in which the hydrophilic moiety (an amino-sugar derivative) and the hydrophobic moiety (a fatty acid) are linked via amide bonds. This results in a chemical linkage, which is highly stable under alkaline conditions. Particularly preferred alkyl glucamide surfactants are N-alkyl-N-acyl-glucamides of the formula (I):

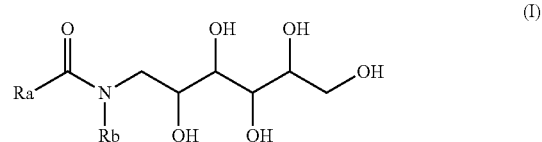

Wherein Ra is a linear or branched, saturated or unsaturated hydrocarbyl group having 6 to 22 carbon atoms, and Rb is a $C_1$-$C_4$ alkyl radical. Particularly preferably, Rb in formula (I) is a methyl radical. Non-limiting examples of these glucamide surfactants are: N-octanoyl-N-methylglucamide, N-nonanoyl-N-methylglucamide, N-decanoyl-N-methylglucamide, N-dodecanoyl-N-methylglucamide, N-cocoyl-N-methylglucamide, available under the trade name of GlucoPure Foam from Clariant, N-lauroyl/myristoyl-N-methylglucamide, (available under the trade name of GlucoPure Deg from Clariant, and N-octanoyl/decanoyl-N-methylglucamide, available under the trade name of GlucoPure Wet by Clariant Alkyl Glucamine Surfactants The compositions of the invention may comprise an amine surfactant selected from amine compounds according to formula (I):

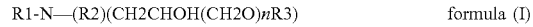

R1-N—(R2)(CH2CHOH(CH2O)$n$R3)   formula (I)

wherein:

R1 and R2 are independently selected from hydrogen, cyclic or acyclic, linear or branched C1 to C10 alkyl, C1 to C10 hydroxyalkyl, polyhydroxyhydrocarbyl and polyalkoxy having the formula (R4-O)xH with R4 being C1-C4 and x is from 1 to 15, preferably x is from 1 to 5, more preferably x is 1; n is 0 or 1, preferably 1;

and R3 is a C6 to C30 hydrocarbyl, preferably C6 to C30 alkyl, hydroxyalkyl, alkoxyalkyl, cycloalkyl, aralkyl or alkenyl.

A "polyhydroxyhydrocarbyl" is a hydrocarbyl with two or more hydroxyl (—OH) groups. A "hydrocarbyl" is a univalent group formed by removing a hydrogen atom from a hydrocarbon, e.g. ethyl, phenyl.

When R1 is a polyhydroxyhydrocarbyl, R1 is an acyclic or cyclic polyhydroxyhydrocarbyl, preferably a linear polyhydroxyhydrocarbyl. Preferably R1 is a linear C3 to C8 chain with at least two hydroxyl groups, preferably a C4 to C7 chain with at least three hydroxyl groups directly bonded to the carbon atoms of the chain. R1 can include substituents, in particular, alkoxy groups e.g. by etherification of further hydroxyl groups or further polyhydroxyhydrocarbyl, e.g. polyhydroxy alkyl, group(s). R1 preferably includes at least three free hydroxyl groups including such hydroxyl groups on substituents of the basic carbon chain. Alternatively R1 can be selected from ring structures comprising an internal ether link, the ring comprising at least two or more hydroxyl groups, most preferably the hydroxyl groups are on a carbon atom not connected to the nitrogen in Formula (I). R1 can be an open chain tetratol, pentitol, hexitol or heptitol group or an anhydro e.g. cycloether anhydro derivative of such a group.

R1 can be a polyhydroxyhydrocarbyl derived from a sugar, preferably a sugar selected from the group consisting of: monosaccharide, disaccharide, or trisacchaside, though a monosaccharide is preferred. For instance, R1 can be the residue of, or a residue derived from a sugar, particularly a monosaccharide such as glucose, xylose, fructose or sorbitol; a disaccharide such as maltose or sucrose; or a higher oligosaccharide. While monosaccharides are preferred, disaccharides and trisaccharides can also be present, typically at the ratios present in the sugar from which the polyhydroxyhydrocarbyl is derived. Preferably, R1 is derived from a sugar of the group consisting of: glucose, xylose, maltose and mixtures thereof.

Preferred R1 groups are derived from glycoses and are of the formula:

—CH2-(CHOH)4-CH2OH          formula II, for instance, corresponding to residues from monosaccharides such as glucose, mannose or galactose, preferably glucose. The aldehyde of the monosaccharide is typically eliminated during the reaction to bind the monosaccharide to the amine of formula I. It is specially preferred when R1 is derived from glucose. In this case the group —NR1 is of the formula:

—N—CH2(CHOH)4CH2OH          formula III and the group is conveniently called a glycamine group. Most preferably the group R1 will be derived from glucose and the corresponding amines may be called glucamines (as they will usually be made from glucose). The group R1 may comprise, one, two or more glucose units, and the resulting glucamine may be a mixture of monoglucamine (R1 comprises one glucose unit), diglucamine (R1 comprises two glucose units) and triglucamine (R1 comprises three glucose units).

When R1 is a C1 to C10 alkyl, it is preferably an alkyl comprising from 1 to 5, more preferably from 1 to 4, even more preferably from 1 to 2 carbon atoms. Most preferably when R1 is not a polyhydroxyhydrocarbyl, it is hydrogen or methyl.

Most preferably R1 is a polyhydroxyhydrocarbyl.

R2 is preferably selected from the group consisting of hydrogen and C1 to C10 alkyl, particularly when R1 is a polyhydroxyhydrocarbyl. R2 is preferably hydrogen or an alkyl group comprising from 1 to 5, more preferably from 1 to 4 and even more preferably from 1 to 2 carbon atoms. Most preferably R2 is hydrogen or methyl.

When R1 is not a polyhydroxyhydrocarbyl, R1 and R2 are preferably independently selected from hydrogen or an alkyl group comprising from 1 to 5 preferably from 1 to 4 and even more preferably from 1 to 2 carbon atoms. Most preferably R1 and R2 are independently selected from hydrogen or methyl.

R3 is a hydrocarbyl, preferably selected from C6 to C30 alkyl, hydroxyalkyl, alkoxyalkyl, cycloalkyl, aralkyl or alkenyl groups, preferably the alkyl group comprises from 6 to 30, preferably from 7 to 20, more preferably from 8 to 15, even more preferably from 8 to 14. The alkyl group can be linear or branched, preferably C1 to C4 branching, more preferably C1 to C3 branching on the 2- or 3-position, preferably 2-position. R3 can also be a substituted alkyl group e.g. a hydroxy or alkoxy substituted alkyl group, particularly a C6 to C30 alkyl group which is hydroxy substituted. The additional hydroxyl group or oxygen atom may provide a modest increase in water solubility. R3 can also be an aralkyl group, particularly a C7 to C12 aralkyl group, such as a benzyl group. R3 is preferably selected from the group consisting of: C6 to C14 alkyl and mixtures thereof, preferably R3 is selected from the group consisting of hexyl, octyl, decyl, docecyl, tetradecyl, and mixtures thereof.

The amine surfactant selected from amine compounds according to formula (I) can have the formula wherein:

R1 is a polyhydroxyhydrocarbyl which is preferably derived from a monosaccharide, more preferably glucose, and has the formula:

—CH2(CHOH)4CH2OH          formula II;

R2 is hydrogen or methyl; and

R3 is selected from the group consisting of: C6 to C10 alkyl and mixtures thereof, preferably R3 is selected from the group consisting of hexyl, octyl, decyl, and mixtures thereof, more preferably R3 is decyl, most preferably R3 is 2-propylheptyl.

Preferred amines for use herein include those in which n is 1, R1 is glucose as such forming a glucamine compound, R2 is methyl and R3 is hexyl, octyl or decyl.

When R3 is octyl, it is preferably selected from n-octyl, and 2-ethylhexyl. When R3 is decyl, it is preferably selected from n-decyl and 2-propylheptyl.

Other preferred amines for use herein are those in which n is 1, R1 and R2 are methyl and R3 is hexyl, octyl or decyl. When R3 is octyl, it is preferably selected from n-octyl and 2-ethylhexyl. When R3 is decyl, it is preferably selected from n-decyl and 2-propylheptyl.

Mixtures of different amines can have benefits in terms of processing, solubility and performance.

While such amine surfactants can have a net positive charge at certain pH, they are typically referred to as nonionic surfactants. However, at low pH (below the pKa of the surfactant) they can have a net positive charge.

These surfactants are described in EP16184415 and US20190055496.

Zwitterionic and Amphoteric Surfactants:

The hard surface cleaning composition may comprise an amphoteric surfactant, a zwitterionic surfactant, and mixtures thereof. Suitable zwitterionic surfactants typically contain both cationic and anionic groups in substantially equivalent proportions so as to be electrically neutral at the pH of use, and are well known in the art. Some common examples of zwitterionic surfactants are described in U.S. Pat. Nos. 2,082,275, 2,702,279 and 2,255,082.

Suitable zwitteronic surfactants include betaines such alkyl betaines, alkylamidobetaine, amidazoliniumbetaine, sulfobetaine (INCI Sultaines) as well as the phosphobetaine.

Suitable betaines are the alkyl betaines of the formula (Ia), the alkyl amido betaine of the formula (Ib), the sulfo betaines of the formula (Ic) and the amido sulfobetaine of the formula (Id);

R1-N+(CH3)2-CH2COO—          (Ia)

R1-CO—NH(CH2)3-N+(CH3)2-CH2COO—          (Ib)

R1-N+(CH3)2-CH2CH(OH)CH2SO3-          (Ic)

R1-CO—NH—(CH2)3-N+(CH3)2-CH2CH(OH)CH2SO3-          (Id)

in which R1 is a saturated or unsaturated C6-C22 alkyl residue, preferably $C_8$-$C_{18}$ alkyl residue. Particularly preferred are betaines of the formula Ia such as for example N-alkyl-N-dimethyl betaine like the one sold under the trade name of Empigen BB by Huntsman.

Examples of suitable betaines and sulfobetaine are the following designated in accordance with [INCI]: Almondamidopropyl of betaines, Apricotamidopropyl betaines, Avocadamidopropyl of betaines, Babassuamidopropyl of betaines, Behenamidopropyl betaines, Behenyl of betaines, betaines, Canolamidopropyl betaines, Capryl/Capramidopropyl betaines, Carnitine, Cetyl of betaines, Cocamidoethyl of betaines, Cocamidopropyl betaines, Cocamidopropyl Hydroxysultaine, Coco betaines, Coco Hydroxysultaine, Coco/Oleamidopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucamidopropyl Hydroxysultaine, Hydrogenated Tallow of betaines, Isostearam idopropyl betaines, Lauramidopropyl betaines, Lauryl of betaines, Lauryl Hydroxysultaine, Lauryl Sultaine, Millkamidopropyl betaines, Minkamidopropyl of betaines, Myristamidopropyl betaines, Myristyl of betaines, Oleamidopropyl betaines, Oleamidopropyl Hydroxysultaine, Oleyl of betaines, Olivamidopropyl of betaines, Palmam idopropyl betaines, Palm itam idopropyl betaines, Palmitoyl Carnitine, Palm Kernelamidopropyl betaines, Polytetrafluoroethylene Acetoxypropyl of betaines, Ricinoleamidopropyl betaines, Sesam idopropyl betaines, Soyamidopropyl betaines, Stearamidopropyl betaines, Stearyl of betaines, Tallowamidopropyl betaines, Tallowamidopropyl Hydroxysultaine, Tallow of betaines, Tallow Dihydroxyethyl of betaines, Undecylenamidopropyl betaines and Wheat Germamidopropyl betaines.

If the composition comprises a zwitterionic surfactant, it is preferably a betaine of the formula Ia such as for example N-alkyl-N-dimethyl betaine like the one sold under the trade name of Empigen BB by Huntsman.alkyl dimethyl betaine.

Amphoteric surfactants can be either cationic or anionic depending upon the pH of the composition. Suitable amphoteric surfactants include dodecylbeta-alanine, N-alkyltaurines such as the one prepared by reacting dodecylamine with sodium isethionate, as taught in U.S. Pat. No. 2,658,072, N-higher alkylaspartic acids such as those taught in U.S. Pat. No. 2,438,091. Other suitable amphoteric surfactants are the products sold under the trade name Miranol by Solvay-Novecare such as, for example, sodium lauroamphoacetate (Miranol Ultra L-32E), sodium stearoampho acetate (Miranol DM), disodium cocoamphodiacetate (Miranol C2m Conc NP), disodium lauroamphodiacetate (Miranol BM Conc), disodium capryloampho dipropionate (Miranol JBS), sodium mixed $C_8$ amphocarboxylate (Miranol JEM Conc), and sodium capryloampho hydroxypropyl sulfonate (Miranol JS). Other non-limiting examples of suitable amphoteric surfactants are disodium capryloamphodiacetate (Mackam 2CY 75-Solvay Novecare), octyliminodipropionate (Ampholak YJH40-Akzo Nobel), sodium lauriminodipropionate (Mirataine H2C-HA-Solvay Novecare), and sodium lauroamphohydroxypropylsulfonate (Mackam LS-Solvay Novecare).

Other suitable additional surfactants can be found in McCutcheon's Detergents and Emulsifers, North American Ed. 1980.

Alkyl Pyrrolidone:

Pyrrolidone-based surfactants, including alkyl pyrrolidones, are well known and their use and methods of making them have been extensively reviewed (for instance in Pyrrolidone-based surfactants (a literature review), Login, R. B. J Am Oil Chem Soc (1995) 72: 759-771). Suitable alkyl pyrrolidones can have the formula:

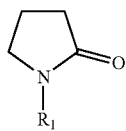

wherein R1 is $C_6$-$C_{20}$ alkyl, or R2NHCOR3, and R2 is $C_1$-$C_6$ alkyl and R3 is $C_6$-$C_2$ alkyl. R1 is preferably $C_6$-$C_{20}$ alkyl. Suitable alkylpyrrolidones include N-alkyl-2-pyrrolidones, wherein the alkyl chain is $C_6$ to $C_{20}$, or $C_6$ to $C_{10}$, or $C_8$.

Suitable alkyl pyrrolidones are marketed under the tradename Surfadone® by the Ashland Inc., such as Surfadone LP-100 (N-octly-2-pyrrolidone) and LP-300 (N-docedycl-2-pyrrolidone), and is also available from BASF.

Anionic Surfactants

If anionic surfactant is present, it is preferably present at low levels. The anionic surfactant can be selected from the group consisting of: an alkyl sulphate, an alkyl alkoxylated sulphate, a sulphonic acid or sulphonate surfactant, polycarboxylated anionic surfactants and mixtures thereof. The antimicrobial hard surface cleaning composition can comprise up to 2.0 wt %, preferably up to 1.0 wt %, or up to 0.1 wt % of anionic surfactant. In most preferred embodiments, the composition is essentially free, or free of, of anionic surfactant.

Suitable polycarboxylated anionic surfactants can be selected from the group consisting of: polyalkoxylate polycarboxylated surfactants, and mixtures thereof.

Suitable polycarboxylated anionic surfactants are described in U.S. Pat. No. 5,376,298, EP0129328, WO03018733, and U.S. Pat. No. 5,120,326.

Suitable polyalkoxylate polycarboxylated surfactant can have the empirical formula:

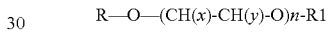

R—O—(CH(x)-CH(y)-O)n-R1 wherein R is a hydrophobic group, preferably a substituted, or unsubstituted, hydrocarbon group typically containing from 6 to 16 carbon atoms, preferably from 8 to 14 carbon atoms, x and y are each independently selected from the group consisting of hydrogen, methyl, and succinic acid radicals, with the proviso that at least one x or y moiety per molecule is a succinic acid radical, wherein n is between 1 and 60, and wherein R1 is hydrogen, substituted hydrocarbon, unsubstituted hydrocarbon preferably having between 1 and 8 carbon atoms, sulfuric, or sulfonic radical, with any acid groups being neutralized by compatible cationic groups, e.g., sodium, potassium, alkanolammonium, magnesium, etc.

Suitable polyalkoxylate polycarboxylates surfactant can have the empirical formula:

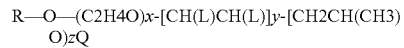

R—O—(C2H4O)x-[CH(L)CH(L)]y-[CH2CH(CH3)O]zQ wherein R is a hydrocarbon hydrophobic group, preferably alkyl, containing from 6 to 16, preferably from 8 to 14 carbon atoms; x is a number from 0 to 60, preferably from 4 to 50, more preferably from 6 to 50; L is either a C1-3 alkyl group or a group having the formula —CH—(COO—)CH2 (COO—), with at least one L group in each molecule being —CH(COO—)CH2(COO—); y is a number from 1 to 12, preferably from 2 to 10, more preferably from 3 to 8; z is a number from 0 to 20, preferably from 0 to 15, more preferably from 0 to 10; and Q is selected from the group consisting of H and sulfonate groups, the compound being rendered electrically neutral by the presence of cationic groups, preferably selected from the group consisting of sodium, potassium, and substituted ammonium, e.g., monoethanol ammonium, cations. Specific examples of such polyalkoxylate polycarboxylate surfactant include the following: Poly-Tergent® C9-51B (CS-1) (x=12; y=8; and Z=17); Poly-Tergent® C9-62P (x=4; y=3; and z=17); Poly-Tergent® C9-74P (x=10; y=3.5; and Z=3.5); and Poly- Tergent® C9-92 (x=approximately 55; y=6.5; and z=0). R is believed to be an alkyl group such as a linear C9 alkyl group, and Q is believed to be H. The Poly-Tergent® surfactants are now sold under the Plurafac® trade name by BASF.

Suitable polycarboxylated anionic surfactants include alkoxylated polymer, alkyl ether, alkenedioic acid salts, for instance, as sold those under the Plurafac CS-10 tradename by BASF. Suitable alkyl sulphates for use herein include water-soluble salts or acids of the formula $ROSO_3M$ wherein R is a $C_6$-$C_{18}$ linear or branched, saturated or unsaturated alkyl group, preferably a $C_8$-$C_{16}$ alkyl group and more preferably a $C_{10}$-$C_{16}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Particularly suitable linear alkyl sulphates include $C_{1214}$ alkyl sulphate like EMPICOL® 0298/, EMPICOL® 0298/F or EMPICOL® XLB commercially available from Huntsman. By "linear alkyl sulphate" it is meant herein a non-substituted alkyl sulphate wherein the linear alkyl chain comprises from 6 to 16 carbon atoms, preferably from 8 to 14 carbon atoms, and more preferably from 10 to 14 carbon atoms, and wherein this alkyl chain is sulphated at one terminus.

Suitable sulphonated anionic surfactants for use herein are all those commonly known by those skilled in the art. Preferably, the sulphonated anionic surfactants for use herein are selected from the group consisting of: alkyl sulphonates; alkyl aryl sulphonates; naphthalene sulphonates; alkyl alkoxylated sulphonates; and $C_6$-$C_{16}$ alkyl alkoxylated linear or branched diphenyl oxide disulphonates; and mixtures thereof.

Suitable alkyl sulphonates for use herein include water-soluble salts or acids of the formula $RSO_3M$ wherein R is a $C_6$-$C_{18}$ linear or branched, saturated or unsaturated alkyl group, preferably a $C_8$-$C_{16}$ alkyl group and more preferably a $C_{10}$-$C_{16}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Suitable alkyl aryl sulphonates for use herein include water-soluble salts or acids of the formula $RSO_3M$ wherein R is an aryl, preferably a benzyl, substituted by a $C_6$-$C_{18}$ linear or branched saturated or unsaturated alkyl group, preferably a $C_8$-$C_{16}$ alkyl group and more preferably a $C_{10}$-$C_{16}$ alkyl group, and M is H or a cation, e.g., an alkali metal cation (e.g., sodium, potassium, lithium, calcium, magnesium and the like) or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Particularly suitable linear alkyl sulphonates include $C_{12}$-$C_{16}$ paraffin sulphonate like Hostapur® SAS commercially available from Clariant. Particularly preferred alkyl aryl sulphonates are alkyl benzene sulphonates commercially available under trade name Nansa® available from Huntsman.

By "linear alkyl sulphonate" it is meant herein a non-substituted alkyl sulphonate wherein the alkyl chain comprises from 6 to 18 carbon atoms, preferably from 8 to 16 carbon atoms, and more preferably from 10 to 16 carbon atoms, and wherein this alkyl chain is sulphonated at one terminus.

Suitable alkoxylated sulphonate surfactants for use herein are according to the formula $R(A)mSO_3M$, wherein R is an unsubstituted $C_6$-$C_{18}$ alkyl, hydroxyalkyl or alkyl aryl group, having a linear or branched $C_6$-$C_{18}$ alkyl component, preferably a $C_8$-$C_{16}$ alkyl or hydroxyalkyl, more preferably $C_{12}$-$C_{16}$ alkyl or hydroxyalkyl, and A is an ethoxy or propoxy or butoxy unit, and m is greater than zero, typically between 0.5 and 6, more preferably between 0.5 and 3, and M is H or a cation which can be, for example, a metal cation (e.g., sodium, potassium, lithium, calcium, magnesium, etc.), ammonium or substituted-ammonium cation. Alkyl ethoxylated sulphonates, alkyl butoxylated sulphonates as well as alkyl propoxylated sulphonates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like.

Exemplary surfactants are $C_{12}$-$C_{18}$ alkyl polyethoxylate (1.0) sulphonate ($C_{12}$-$C_{18}$E(1.0)SM), $C_1$-$C_{18}$ alkyl polyethoxylate (2.25) sulphonate ($C_1$-$C_{18}$(2.25)SM), $C_{12}$-$C_{18}$ alkyl polyethoxylate (3.0) sulphonate ($C_{12}$-$C_{18}$E(3.0)SM), and $C_{12}$-$C_{18}$ alkyl polyethoxylate (4.0) sulphonate ($C_{12}$-$C_{18}$E (4.0)SM), wherein M is conveniently selected from sodium and potassium. Particularly suitable alkoxylated sulphonates include alkyl aryl polyether sulphonates like Triton X-200® commercially available from Dow Chemical.

Preferably said sulphated or sulphonated anionic surfactant for use herein is selected from the group consisting of alkyl sulphates (AS) preferably $C_{12}$, $C_{13}$, $C_{14}$ and $C_{15}$ AS, sodium linear alkyl sulphonate (NaLAS), sodium paraffin sulphonate $NaPC_{12-16}S$, and mixtures thereof. Most preferably sulphated or sulphonated anionic surfactant for use herein is selected from the group consisting of alkyl sulphates (AS) preferably, $C_{12}$, $C_{13}$, $C_{14}$ and $C_{15}$ AS, sodium linear alkyl sulphonate (NaLAS), sodium paraffin sulphonate $NaPC_{12-16}S$ and mixtures thereof.

Particularly preferred surfactants for use herein include nonionic surfactants, in particular branched alcohol alkoxylates, more in particular 2-ethyl hexan-1-ol ethoxylated to a degree of from 4 to 6, and propoxylated to a degree of from 4 to 6, more preferably, the alcohol is first propoxylated and then ethoxylated, and 2-alkyl-1-alkanols such as alkoxylated $C_{10}$ guerbet alcohols with 1 to 14, preferably 2 to 8, more preferably 3 to 6 ethoxylate or ethoxylate-propoxylate units. Other particularly preferred non-ionic surfactants include linear alcohol alkoxylated nonionic surfactants with $C_8$, $C_{10}$, $C_{12}$, mixtures of $C_8$ to $C_{10}$, mixtures of $C_{10}$ to $C_{12}$, mixtures of $C_9$ to $C_{11}$ linear alkyl chain and 8 or less ethoxylate units, preferably 3 to 8 ethoxylate units. Most preferably the alkoxylated nonionic surfactant is selected from the group consisting of: 2-propylheptyl EO8 (Lutensol XL89-BASF); 2-propylheptyl EO5 (Lutensol XL50-BASF); $C_{10}$ alcohol EO5 (Lutensol ON 50-BASF); $C_{10}$ alcohol EO7 (Lutensol ON 70-BASF); $C_5$-$C_{10}$ alcohol EO5 (Novel 810 FD5 Sasol); $C_{10}$ alcohol EO4 (Novel 10-4 Sasol); and 2-ethyl-hexanol PO5EO6 (Ecosurf EH6-Dow).

Other particularly preferred surfactants for use here in include linear amine oxide surfactants, in particular $C_8$-$C_{12}$ dimethyl amine oxide, more in particular $C_{10}$ dimethyl amine oxide; alkyldimethylbetaine surfactants, more in particular N,N-Dimethyl-N-dodecylglycine betaine (Empigen BB-Huntsman); alkyl glucamide surfactants such as N-alkyl-N-acylglucamide preferably N-decanoyl-N-methylglucamine, and the alkyl glucamide surfactants sold under the name of GlucoPure®, GlucoTain®, and GlucoWet® by Clariant; alkylpolyglucoside surfactants, more in particular $C_8$ to $C_{12}$ alkyl polyglucosides, more preferably $C_8$ to $C_{10}$ alkyl polyglucosides such as for example Triton CG50 (Dow).

pH Adjusting Agents

Depending on the targeted uses, a liquid formulation of the present invention for home care use may need appropriate pH condition. For example, if the liquid product is used in the kitchen area, a high pH product may be desired in order to effectively remove grease soils commonly found in the area. If the product is used in bathroom area, soap scum and hard water deposits may be the primary concern. In such case, a low pH product may be more appropriate for such a purpose. There is no limitation on the types of pH adjusting agents that can be added into the liquid composition of the present invention. Example of pH adjusting agents that can be used include, but are not limited to, triethanolamine, diethanolamine, monoethanolamine, sodium hydroxide, sodium carbonate, potassium hydroxide, potassium carbonate, calcium carbonate, citric acid, acetic acid, hydrochloric acid, sulfamic acid, sulfuric acid and the like.

Other than components mentioned above, additional functional components may be included in the composition of the present invention. Additional components include, but are not limited to, chelants, compatibilizers, coupling agents, corrosion inhibitors, rheology modifiers, fragrances, colorants, preservatives, UV stabilizers, optical brighteners, and active ingredient indicators.

Preferred compositions herein include compositions comprising:
i) from about 0.05% to about 2% by weight of the composition of the nitrogen containing biocidal compound, preferably a quaternary ammonium compound, preferably a mixture of N-alkyl dimethyl benzyl ammonium chloride, N-octyl decyl dimethyl ammonium chloride, di-n-decyl dimethyl ammonium chloride, and di-n-dioctyl dimethyl ammonium chloride;
ii) from 0.1% to about 4% by weight of the composition of the polymer, preferably the polymer comprises monomers of trimethylammoniumpropylmethacrylamide chloride; of N-isopropylacrylamide; acrylic acid and/or methacrylic acid and salts thereof; and 2-acrylamido-2-methyl-1-propane-sulfonic acid;
iii) from 0.05% to 2% by weight of the composition of a surfactant selected from the group consisting of an amine oxide surfactant, a non-ionic surfactant and mixtures thereof, preferably a mixture of C10 dimethyl amine oxide and ethyl hexanol PO5EO6.
iv) from about 0.2% to about 3% by weight of the composition of a base, preferably monoethanolamine; and
v) from about 95% to 99% of water.

Preferred compositions herein include compositions comprising:
i) from about 0.05% to about 2% by weight of the composition of the nitrogen containing biocidal compound, preferably a quaternary ammonium compound, preferably a mixture of N-alkyl dimethyl benzyl ammonium chloride, N-octyl decyl dimethyl ammonium chloride, di-n-decyl dimethyl ammonium chloride, and di-n-dioctyl dimethyl ammonium chloride;
ii) from 0.1% to about 4% by weight of the composition of the polymer, preferably the polymer comprises monomers of trimethylammoniumpropylmethacrylamide chloride; of N-isopropylacrylamide; acrylic acid and/or methacrylic acid and salts thereof; and 2-acrylamido-2-methyl-1-propane-sulfonic acid;
iii) from 0.05% to 2% by weight of the composition of a non-ionic surfactant;
iv) from about 0.2% to about 3% by weight of the composition of an acid, preferably citric acid; and
v) from about 95% to 99% of water.

Application of the Composition

The composition may be applied by a variety of means. If sprayed, the composition advantageously may be supplied in a conventional bottle with a sprayer. The sprayer can be a trigger sprayer. As an option to a trigger sprayer, an aerosol can also be used to deliver the liquid formulation on to surfaces. Additional application means include, but are not limited to, fogging, rolling, brushing, mopping, and using a wipe by a variety of application devices. It is within the scope of the present invention that wipe products can also be made comprising or pre-treated with the disinfectant formulation(s) of the present invention, for example, for off-the-shelf sale or use.

To disinfect a contaminated surface, spray the liquid formulation until the area is completely covered. The wet formulation subsequently may be wiped dry with a dry cloth or paper towel.

The invention also relates to an article treated with a disinfectant formulation in accordance with aspects of the invention.

EXAMPLES

Example 1: Table 1 shows composition according to the invention (Compositions A to F). The compositions are used as hard surface disinfectant cleaners. They provide 24 hour residual self-sanitizing (RSS) performance in combination with excellent cleaning and good surface shine appearance. The ingredients are expressed as weight percentage of the total composition. Composition G is outside of the scope of the invention.

TABLE 1

| Example RSS formulations based on the invention | | | | | | | |
|---|---|---|---|---|---|---|---|
|  | A | B | C | D | E | F | G |
| n-Alkyl Dimethyl Benzyl Ammonium Chloride | 0.2 | 0.2 | 0.2 | 0.2 | 0.4 | 0.4 | 0.0 |
| Di-n-Octyl Dimethyl Ammonium Chloride | 0.075 | 0.075 | 0.075 | 0.075 | 0.15 | 0.15 | 0.0 |

TABLE 1-continued

Example RSS formulations based on the invention

| | A | B | C | D | E | F | G |
|---|---|---|---|---|---|---|---|
| n-Octyl Decyl Dimethyl Ammonium Chloride | 0.15 | 0.15 | 0.15 | 0.15 | 0.3 | 0.3 | 0.0 |
| Di-n-Decyl Dimethyl Ammonium Chloride | 0.075 | 0.075 | 0.075 | 0.075 | 0.15 | 0.15 | 0.0 |
| Hydrogen peroxide solution | 0.0 | 0.0 | 0.0 | 0.0 | 0.0 | 0.0 | 0.5 |
| Dodecyl dimethyl amine oxide | 0.5 | 0.5 | 0.0 | 0.0 | 0.0 | 0.0 | 0.0 |
| Decyl dimethyl amine oxide | 0.0 | 0.0 | 0.5 | 0.5 | 0.0 | 0.0 | 0.5 |
| N-decanoyl-N-methylglucamine | 0.0 | 0.5 | 0.0 | 0.0 | 0.0 | 0.0 | 0.0 |
| 2-ethylhexyl PO5EO6 | 0.0 | 0.0 | 0.5 | 0.0 | 0.5 | 0.5 | 0.5 |
| C11-15 secondary alcohol EO40 | 0.5 | 0.0 | 0.0 | 0.5 | 0.0 | 0.0 | 0.0 |
| C9-11 ethoxylated alcohol EO6 | 0.0 | 0.5 | 0.0 | 0.0 | 0.0 | 0.0 | 0.0 |
| N,N-Dimethyl-N-dodecylglycine betaine | 0.0 | 0.0 | 0.0 | 0.5 | 0.0 | 0.0 | 0.0 |
| Monoethanolamine | 0.0 | 0.0 | 0.5 | 0.5 | 0.0 | 0.0 | 0.5 |
| Triethanolamine | 0.5 | 0.5 | 0.0 | 0.5 | 0.0 | 0.0 | 0.0 |
| Poly(MAPTAC-M-AMPS-NIPAM) | 1.0 | 1.0 | 1.0 | 1.0 | 1.5 | 1.5 | 1.0 |
| Citric acid | 0.0 | 0.0 | 0.0 | 0.0 | 2.5 | 2.5 | 0.0 |
| Fragrance | 0.1 | 0.1 | 0.1 | 0.1 | 0.1 | 0.1 | 0.1 |
| Water | Balance | Balance | Balance | Balance | Balance | Balance | Balance |
| pH | >10 | >10 | >10 | >10 | <4 | <4 | >10 |

Example 2: Performance comparison of Composition C without polymer (Composition 1), composition C(Composition 2), composition C with 1% by weight of the composition of polymers outside the invention (Composition 3 to 6) and Composition G, with hydrogen peroxide instead of quaternary ammonium compounds (Composition 7) is displayed in Table 2.

In the absence of any polymer (Composition 1), the composition fails to achieve 24 hour RSS, has a poor streaking performance and only a moderate cleaning index.

The composition of the invention (Composition 2) with poly (MAPTAC-M-AMPS-NIPAM) delivered 24 hour RSS, only slight-to-moderate streaking and far superior cleaning to all other compositions tested. Composition 2 used a mixture of quaternary ammonium compounds as biocidal active with a total concentration of 0.5%; this can be directly compared with Composition 7, which used the same polymer and 0.5% hydrogen peroxide, but the latter fails to achieve 24 h RSS.

Compositions with polymers devoid of AMPS and NIPAM monomers (Compositions 3 and 4), such as those described in EP2797413B1 and DE100634271A1, resulted in far inferior cleaning compared to the composition containing poly(MAPTAC-M-AMPS-NIPAM). Without being bound by theory, it is believed that the additional amphiphilic nature of NIPAM, and the water absorbing capacity of AMPS, help to increase grease solubilisation and thus provide polymer-driven cleaning benefits.

Compositions with polymers containing DADMAC monomer (Compositions 5 and 6), such as those described in EP2797413B1, resulted in very poor shine profiles and had phase stability issues in the case of poly (DADMAC-M) (Composition 5).

| | 1 | 2 | 3 | 4 | 5 | 6 | 7 |
|---|---|---|---|---|---|---|---|
| Polymer (1.0%) | No polymer control | Poly MAPTAC-M-AMPS-NIPAM | Poly MAPTAC-M-Ethyl acrylate | Poly MAPTAC-M-Acryl amide | Poly DADMAC-M | Poly (DADMAC-Acryl amide | Poly MAPTAC-M-AMPS-NIPAM |
| Biocidal active | Quat [1] | Quat [1] | Quat [1] | Quat [1] | Quat [1] | Quat [1] | Hydrogen peroxide |
| 24 hour RSS [2] | Fail | Pass | Pass | Pass | Pass | Pass | Fail |
| Shine grade [3] | >5 | 3-4 | 3-4 | 3-4 | >5 | >5 | >5 |
| Surface Feel [4] | Smooth | Smooth | Smooth | Smooth | Smooth | Smooth | Smooth |
| Phase stability [5] | Single phase | Single phase | Single phase | Single phase | Phase separation | Single phase | Single phase |
| Cleaning index vs ref (100) [6] | ca. 100 | 200-250 | 100-170 | ca. 40 | Not tested | Not tested | Not tested |

[1] Quat: Mixture of n-Alkyl Dimethyl Benzyl Ammonium Chloride, Di-n-Octyl Dimethyl Ammonium Chloride, n-Octyl Decyl Dimethyl Ammonium Chloride, Di-n-Decyl Dimethyl Ammonium Chloride

[2] Protocol based on EPA01-1A (24 hr Residual Self-Santizing, 12 abrasion cycles) using *Enterobacter aerogenes* as the test organism and glass as the test surface. A pass result refers to at least 99.9% reduction (log 3 reduction) in bacteria at the end of the abrasion regimes, when the final contact time is 5 minutes.

[3] Shine grade of black, glossy ceramic tiles after product application and wiping. Panelists visually assess the streaking appearance of the tiles according to the following scale; 0 = No streaks, 1 = Very slight streaks, 2 = Slight streaks, 3 = Slight to moderate streaks, 4 = Moderate streaks, 5 = Moderate to heavy streaks, 6 = Heavy streaks.

[4] Surface feel was assessed via panellists gently rubbing the dried tiles and characterising the feel either as sticky or smooth.

[5] Phase stability was assessed visually, with a single phase referring to compositions that were clear and transparent, and phase separation referring to compositions displaying cloudiness and visible signs of at least 2 phases forming.

[6] Cleaning of baked-on/polymerised grease on enamel surfaces. Formulations are applied to a sponge and the number of wiping strokes recorded to achieve complete soil removal. The number of strokes is then indexed vs a standard hard surface cleaner (index 100). A higher index implies better cleaning performance.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A disinfectant cleaning composition, the composition comprising:
   i) a nitrogen containing biocidal compound comprising a mixture comprising from 30% to 50%, by weight of the mixture of N-alkyl dimethyl benzyl ammonium chloride, from 20% to 40% by weight of the mixture of N-octyl decyl dimethyl ammonium chloride, from 5% to 25% by weight of the mixture of di-n-decyl dimethyl ammonium chloride, and 5% to 25% by weight of the mixture of di-n-dioctyl dimethyl ammonium chloride;
   ii) a polymer comprising monomers of the following formulae:
   a) H2C=CR1-CO—NH—R2-N+R3R4R5X—
   wherein R1 represents hydrogen or C1-C4 alkyl;
   R2 represents linear or branched C1-C12 alkylene;
   R3, R4 and R5, independently of one another, each represent hydrogen, C1-C18 alkyl or phenyl;
   and X— represents an anion selected from the group consisting of halide, sulfate, alkylsulfate, hydroxide, phosphate, acetate and formate;
   b) 40-75% by weight of N-isopropylacrylamide, based on the water-soluble polymer;
   c) acrylic and/or methacrylic acid and/or salts thereof; and
   d) H2C=CR—CO—NH—CR'R"R'"—SO3H, and salts thereof; wherein R, R' and R", independently represent hydrogen, C1-C4 alkyl or C1-C4 alkylene, and R' independently represents C1-C4 alkyl or C1-C4 alkylene.

2. The composition according to claim 1 wherein the monomers a), b), c), and d) are present in weight ratios of about 25 to about 45%, about 40 to about 70%, about 1 to about 15%, and about 1 to about 15%, respectively, based on 100% weight of the polymer.

3. The composition according to claim 1 wherein the polymer comprises monomers of trimethylammoniumpropylmethacrylamide chloride; of N-isopropylacrylamide; acrylic acid and/or methacrylic acid and salts thereof and 2-acrylamido-2-methyl-1-propane-sulfonic acid.

4. The composition according to claim 1 wherein the composition is in the form of an aqueous liquid.

5. The composition according to claim 1 comprising from about 0.1% to about 5% by weight of the composition of the polymer.

6. The composition according to claim 1 comprising from about 0.05% to about 5% by weight of the composition of the nitrogen containing biocidal compound.

7. The composition according to claim 1 comprising from about 0.05% to about 5% by weight of the composition of a surfactant, wherein the surfactant is selected from the group consisting of alkyl polyglucoside, fatty alcohol alkoxylate, betaine, alkyl glucamine, alkyl glucamide, amine oxide and mixtures thereof.

8. The composition according to claim 1 comprising from about 0.1% to about 10% by weight of the composition of a pH adjusting agent.

9. The composition according to claim 1 comprising:
   i) from about 0.05% to about 2% by weight of the composition of the nitrogen containing biocidal compound;
   ii) from about 0.1% to about 4% by weight of the composition of the polymer, wherein the polymer comprises monomers of trimethylammoniumpropylmethacrylamide chloride; of N-isopropylacrylamide; acrylic acid and/or methacrylic acid and salts thereof; and 2-acrylamido-2-methyl-1-propane-sulfonic acid;
   iii) from about 0.05% to about 2% by weight of the composition of a surfactant selected from the group consisting of an amine oxide surfactant, a non-ionic surfactant and mixtures thereof;
   iv) from about 0.2% to about 3% by weight of the composition of a pH adjusting agent; and
   v) from about 90% to about 99% of water.

10. The composition according to claim 1 wherein the composition imparts biocidal residuality to a surface.

11. An article treated with a composition according to claim 1 wherein the article is in the form of a wipe or in the form of any disposable substrate.

12. The disinfectant cleaning composition of claim 1, wherein the monomers comprise at least a 3-trimethylammoniumpropylmethacrylamide chloride (MAPTAC) monomer.

13. The disinfectant cleaning composition of claim 1, comprising from about 0.05% to about 10% by weight of the composition of the quaternary ammonium compound.

14. A disinfectant cleaning composition, the composition comprising:
   a biocidal active comprising from about 0.05% to about 5% by weight of the composition of a nitrogen containing biocidal compound comprising a mixture comprising from 30% to 50%, by weight of the mixture of N-alkyl dimethyl benzyl ammonium chloride, from 20% to 40% by weight of the mixture of N-octyl decyl dimethyl ammonium chloride, from 5% to 25% by weight of the mixture of di-n-decyl dimethyl ammonium chloride, and 5% to 25% by weight of the mixture of di-n-dioctyl dimethyl ammonium chloride;
   a polymer comprising poly-MAPTAC-M-AMPS-NIPAM;
   40-75% by weight of N-isopropylacrylamide, based on the water-soluble polymer;
   acrylic and/or methacrylic acid and/or salts thereof; and H2C=CR—CO—NH—CR'R"R'"—SO3H, and salts thereof; wherein R, R' and R", independently represent hydrogen, C1-C4 alkyl or C1-C4 alkylene, and R''' independently represents C1-C4 alkyl or C1-C4 alkylene.

15. The disinfectant cleaning composition of claim 14, wherein the biocidal active comprises 0% by weight of the composition of hydrogen peroxide.

* * * * *